Patented May 16, 1933

1,908,916

UNITED STATES PATENT OFFICE

HERMANN NOERR, OF LEVERKUSEN-ON-THE-RHINE, GUSTAV MAUTHE, OF COLOGNE-HOLWEIDE, AND ARNOLD DOSER, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

TANNING PREPARATION

No Drawing. Application filed February 18, 1930, Serial No. 429,455, and in Germany February 21, 1929.

The present invention relates to new tanning compositions, more particularly it relates to new compositions of matter comprising a water-soluble, gelatine-precipitating acid derivative of humic acids, lignite or the like, and a gelatine-precipitating, water-soluble condensation product of a di- or polyhydroxy benzene, containing a free para-position to a hydroxy group, and an aromatic or aliphatic aldehyde, said condensation product being free from sulfonic acid groups.

The water-soluble humic acid derivatives (referred to below as component A) are obtainable according to the process described in British Letters Patent No. 284,670 by simultaneously introducing into an aqueous solution of degraded lignite (brown coal) an aqueous solution of alkali metal hydroxide, -carbonate or -dicarbonate and chlorine, at about 0–80° C. and while keeping a neutral or weakly alkaline reaction, and finally acidifying the solution by introducing chlorine or a mineral acid. The term "degraded lignite (brown-coal)" as used in the specification referred to is to include the products obtainable by treating lignite with chlorine, nitric acid or with an alkali metal sulfite in the presence of water or of an alkali and water, or by treating lignite with oxygen or air in the presence of alkali and water. Furthermore this term is to include the alkali metal salts of humic acids and derivatives thereof obtainable by treating the same with alkali metal sulfite, with chlorine, with alkali metal sulfite and chlorine, with oxygen or with air. Furthermore there may be used as component A the compounds prepared according to the process described in British Letters Patent 323,781 which process consists in slowly introducing into a weakly acid solution of degraded lignite chlorine and gradually an aqueous solution of an alkali metal hydroxide at a weakly acid reaction; between about 0 and 80° C., and finally acidifying the reaction mixture: or also as component A the products may be used obtainable by extracting the products, obtainable in accordance with the above cited British Letters Patents, with an organic solvent, such as acetone, methanol and ethanol, said solvents preferably containing a small quantity (1–3%) of water, and carefully drying the extracted materials, said process of purifying being described in British Letters Patent 332,204.

As the second component (referred to below as component B) there may be used one of the condensation products obtainable by condensing a di- or poly-hydroxybenzene containing a free para-position to a hydroxy group, with acetaldehyde or derivatives thereof in the presence of an acid or basic reacting condensing agent, said process being described in German Patent 282,313, or by the process as described in German Patent 344,033, which process consists in condensing one mol. of a di- or polyhydroxybenzene containing a free para-position to a hydroxy group, with ½–1 mol. of an aliphatic aldehyde at 100° C., in case of formaldehyde in the presence of an acid condensing agent. Furthermore there may be used as component B the condensation products obtainable by condensing resorcinol or pyrogallol with benzaldehyde or a hydroxy or halogen nuclear substitution product thereof in aqueous solution between about 0° C. and the boiling point.

The relative proportions of the two components A and B may be varied in the widest limits, depending on the specific use to which the composition is put. Even a small addition of the component B changes the properties of the humic acid derivatives. Thus, for example a ratio of 8 parts of a component A to 1 part of a component B suffices to produce a tanning agent of excellent properties. This renders possible an advantageous use of a hydroxy-aryl condensation product the manufacturing costs of which have hitherto excluded any practical application. For the purpose of the invention there are preferably used compositions in which for 8 parts of the component A at least about one part of the component B is present.

The above combinations can be used in conjunction with neutralizing agents, such as sodium acetate, acids, vegetable tanning agents, synthetic tanning agents, for example, such as are obtainable by condensing a naphthalene sulfonic acid, cresol sulfonic acid, or resin sulfonic acids with formaldehyde, or mixtures of these substances. Alternatively, the solutions of the individual components can be caused to act on the hides one after the other, preferably beginning with the component B.

Compositions comprising synthetic tanning substances, such as the above, exhibit great similarity to vegetable tanning agents and display important advantages over the individual components used alone and over the known synthetic tanning agents. The color of the leather manufactured by means thereof is much lighter than that of the one obtained with the individual components A, the velocity of tanning is increased, the touch, plumpness and grain are similar to those resulting from the use of vegetable tanning agents. The tannings obtained with the new compositions differ advantageously in many respects from the tannings obtained with the individual components B alone. The latter do indeed, yield a plump, beautiful leather, which however is usually soft and without resistance to deformation, that is, it is flexible; moreover it is very unstable to light. In contradistinction thereto, the leather produced by means of the new tanning compositions is practically stable to light and besides, good plumpness, and satisfactory resistance to deformation is obtained; accordingly the new tanning agents can also find application for the tanning of sole-leather, to which application the synthetic tanning substances hitherto found in commerce could be put only to a very restricted extent.

The components B, the neutral solutions of which are precipitated after some time even by weak acids, such as formic acid or oxalic acid, can be incorporated with the tanning substances of the components A, some of which exert an acid reaction to Congo red, without causing flocculation.

The new tanning agents can easily be produced poor in neutral salts, in contradistinction to the customary tanning agents containing sulfonic acid groups, particularly, when the extracts, obtainable by extracting with an organic solvent the tanning agents prepared from degraded lignite, as described above, are used as component A. It is then indeed possible to obtain a tanning agent practically free from salt, which is important for the manufacture of sole-leather. The presence of considerable quantities of neutral salts influences adversely the swelling during tanning and consequently the resistance to deformation and the yield of the leather; furthermore, only tanning agents poor in neutral salts can find application in the method customary in the sole-leather industry for revivifying the exhausted tanning liquors, since otherwise a harmful increase of the neutral salt concentration occurs.

A partial neutralization of the new tanning agents by means of alkali or ammonium acetates or oxalates, ammonia and the like is often advantageous.

The invention is illustrated by the following examples, without being restricted thereto:

*Example 1.*—Equal parts of a 50% paste of a lignite tanning agent and of a 50% syrup of the condensation product of resorcinol and acetaldehyde (resorcinol tanning agent) are kneaded together at a moderate temperature. A viscous syrup is thereby formed, which after some time solidifies to a solid mass, readily soluble in water. The lignite tanning agent has been prepared in the following manner:

100 parts by weight of lignite (water content 50%) are finely ground and suspended in 300 parts by weight of water. Then 50 parts by weight of chlorine are introduced; the mass is filtered and the residue on the filter is suspended in 100 parts by weight of water, neutralized with caustic soda solution; then 10 parts by weight of crystallized sodium sulfite are added and the mass is boiled for one hour. After cooling and filtering there are introduced simultaneously into the filtrate 22 parts by weight of chlorine and 67 parts by weight of a 33% caustic soda solution, the solution thereby being kept neutral or weakly alkaline; finally 14 parts by weight of chlorine are introduced and then the suspension formed is filtered.

A leather produced with this tanning composition is plump and light colored. The shade corresponds with that of pit-tanned sole-leather. A mixture of this tanning agent with equal parts of quebracho gives a very plump leather of good resistance to deformation; the reddish shade of quebracho leather, which is frequently considered unpleasant, is replaced by a light yellowish brown, beautiful leather color.

*Example 2.*—80 parts of pure tanning agent obtained by extracting the humic acid tanning agent used in Example 1 with acetone containing 3% of water are mixed homogeneously with 10 parts of pure tanning agent in the form of a condensation product prepared by condensing 100 parts by weight of resorcinol and 40 parts by weight of benzaldehyde in the presence of hydrochloric acid. To this composition there are added 10 parts by weight of pure tanning agent in the form of a partly neutralized condensation product of a naphthalene sulfonic acid and formaldehyde, and 3 parts by weight of crystalline sodium acetate. The mixture can be dissolved in a little water to an oily syrup, which resembles a vegetable tanning extract. The leather tanned with this tanning agent possesses satisfactory plumpness and a light yellowish-brown color. It is suitable for example, for the light-weight varieties of sole leather, for a plain-leather, pocket book leather, fawn leather and vegetable splits.

A mixture with quebracho or mangrove in the proportion of 1:1 yields a plump leather of good resistance to deformation, suitable for sole-leather. When using such reddish vegetable tanning agents simultaneously the red shade thereof is converted in an advantageous manner into a yellowish brown desirable leather color, which is very important, especially in the use of mangrove. Obviously all other known vegetable tanning agents can also be used in conjunction with the compositions, obtainable in accordance with the present invention.

In the annexed claims we mean by the term "water-soluble, gelatine-precipitating acid derivative of degrated lignite" all the products referred to above under "A", and by the term "water-soluble, gelatine-precipitating condensation product of a di- or poly-hydroxy-benzene containing a free para-position to a hydroxy group, with an aliphatic or aromatic aldehyde" all the products referred to above under "B".

We claim:

1. A new composition of matter comprising a water-soluble, gelatine-precipitating acid derivative of degraded lignite and a gelatine-precipitating water-soluble condensation product of a di- or polyhydroxybenzene containing a free para-position to a hydroxy group, with an aliphatic or aromatic aldehyde.

2. A new composition of matter comprising a water-soluble, gelatine-precipitating acid derivative of degraded lignite and a gelatin-precipitating water-soluble condensation produce of a di- or polyhydroxy benzene, containing a free para-position to a hydroxy group, with an aliphatic or aromatic aldehyde, a synthetic tanning agent and a neutralizing agent.

3. A new composition of matter comprising (a) a water-soluble gelatine precipitating acid derivative of degraded lignite prepared by treating 100 parts by weight of lignite (water content 50%), finely suspended in 300 parts by weight of water, with 50 parts by weight of chlorine, suspending the filtered mass in 100 parts by weight of water, neutralizing with caustic soda solution, adding 10 parts by weight of crystallized sodium sulfite, boiling for one hour, simultaneously introducing into the filtrate 22 parts by weight of chlorine and 67 parts by weight of 33% caustic soda solution, the solution thereby being kept neutral or weakly alkaline, then passing in 14 parts by weight of chlorine filtering and carefully drying this suspension and extracting it with acetone containing 3% of water; (b) a gelatine-precipitating, water-soluble condensation product of resorcinol and benzaldehyde; (c) a condensation product prepared from a naphthalene sulfonic acid and formaldehyde and sodium acetate.

4. A new composition of matter comprising 8 parts of a water-soluble gelatine-precipitating acid derivative of degraded lignite, and at least 1 part of a gelatine precipitating water-soluble condensation product of a di- or poly-hydroxybenzene, containing a free para-position to a hydroxy group, with an aliphatic or aromatic aldehyde.

5. A new composition of matter comprising 8 parts of a water-soluble, gelatine-precipitating acid derivative of degraded lignite, and at least one part of a gelatine-precipitating, water-soluble condensation product of a di- or poly-hydroxy benzene, containing a free para-position to a hydroxy group, with an aliphatic or aromatic aldehyde, a synthetic tanning agent and a neutralizing agent.

6. A new composition of matter comprising (a) a water-soluble gelatine-precipitating acid derivative of degraded lignite prepared by treating 100 parts by weight of lignite (water content 50%), finely suspended in 300 parts by weight of water with 50 parts by weight of chlorine, suspending the filtered mass in 100 parts by weight of water, neutralizing with caustic soda solution, adding 10 parts by weight of crystallized sodium sulfite, boiling for one hour, simultaneously introducing into the filtrate 22 parts by weight of chlorine and 67 parts by weight of 33% caustic soda solution, the solution thereby being kept neutral or weakly alkaline, then passing in 14 parts by weight of chlorine filtering and carefully drying this suspension and extracting it with acetone containing 3% of water; (b) a condensation product of resorcinol and benzaldehyde, the two gelatine precipitating derivatives being present in the ratio of 8 to at least 1; (c) a condensation product prepared from a naphthalene sulfonic acid and formaldehyde and sodium acetate.

In testimony whereof, we affix our signatures.

HERMANN NOERR.
GUSTAV MAUTHE.
ARNOLD DOSER.